United States Patent [19]

Diedrich

[11] Patent Number: 4,755,932

[45] Date of Patent: Jul. 5, 1988

[54] INTERPRETER PROGRAM FOR PROVIDING COMMANDS TO A COMPUTER APPLICATION PROGRAM

[75] Inventor: Richard A. Diedrich, Rochester, Minn.

[73] Assignee: International Business Machines Corporation, Armonk, N.Y.

[21] Appl. No.: 787,285

[22] Filed: Oct. 15, 1985

[51] Int. Cl.⁴ .............................................. G06F 1/00
[52] U.S. Cl. ................................... 364/200; 364/300; 379/88; 379/96
[58] Field of Search ... 364/513.5, 200, 900 MS FILE, 364/300; 381/51, 52; 379/52, 88, 89, 96, 97

[56] References Cited

U.S. PATENT DOCUMENTS 4,598,367  7/1986  De Francesco et al. ......... 381/51 X

Primary Examiner—Raulfe B. Zache
Attorney, Agent, or Firm—Bradley A. Forrest

[57] ABSTRACT

An interpreter is provided which enables a user of a computer to add additional function to existing programming applications independent of the applications. The interpreter interfaces between an advanced function, such as voice synthesis, and an application, such as an office calendar and mail system. The user defines the part of the application on which to apply the voice synthesis in a high level computer language. This definition can include transformation of touch tone pulses to commands for the application as would generally be entered by keyboard. The definition then applies the function as directed by the user, such as to read the mail, or read the calendar, either by means of speaker coupled to the computer or over telephone lines to a remote user.

15 Claims, 9 Drawing Sheets

PROGRAM FLOW

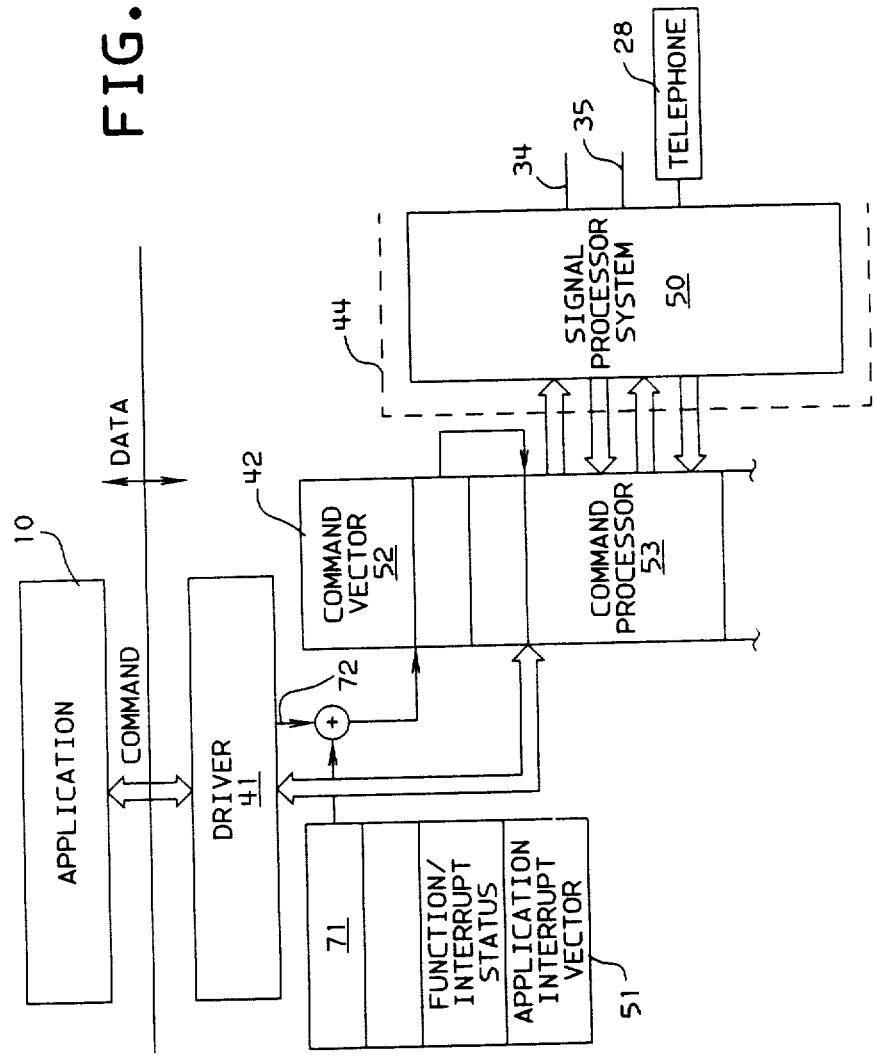

PROGRAM FLOW

PROFILE PARSE FLOW

INITIALIZE EMULATOR
AND VOICE INTERFACE

SUPERVISE COMMAND
EXECUTION FLOW

CLOSE DOWN
FLOW

INTERPRETER PROGRAM FOR PROVIDING COMMANDS TO A COMPUTER APPLICATION PROGRAM

INCORPORATION BY REFERENCE

U.S. patent application Ser. No. 786,913 for Hardware Resource Management, filed Oct. 11, 1985 and assigned to the same assignee as the present application is hereby incorporated by reference.

BACKGROUND OF THE INVENTION

The present invention relates to the provision of extra functions for programming applications independent of the applications.

When functions were added to computer programming applications, extensive reprogramming of the applications was required to accommodate the functions. Some functions, such as musical tone generation were provided in the form of a subroutine, which could be called during the execution of a program written in a high level language. Adding these functions to a program already in existence required modification to the program to add a call to the subroutine. Most users are not capable of this reprogramming effort. In fact, many existing license agreements under which users are permitted to use the program do not let the user look at the actual programming. In these causes, implementation of the added function may be be possible, and is likely impossible by the average user.

One such function available today involves the use of voice with mail and calendar applications. This has been done by specific application programs for the specific voice to mail or voice to calendar function.

SUMMARY OF THE INVENTION

An interpreter program is provided which enables a user of a computer to add additional function to existing programming applications independent of the applications. The interpreter supervises the interaction between an operating system and the application program whereby the application program's operation can be modified to use an advanced function in the operating system. A profile for the interpreter allows the interpreter to be adapted to individual applications programs. Commands and their associated parameters in the profile are initialized into the interpreter program. The interpreter program then supervises the execution of the commands by the operating system or the application program whereby the application program operates as if it has an advanced function provided by the operating system.

For example, the interpreter program supervises the interaction between an advanced function, such as voice synthesis, and an application, such as an office calendar and mail system. The user defines the part of the application on which to apply the voice synthesis in a high level computer language. This definition can include transformation of touch tone pulses to commands for the application which would generally be entered by keyboard. The definition then applies the function as directed by the user entered touch tones to read the mail, or read the calendar, either by means of speaker coupled to the computer or over telephone lines to a remote user.

The high level language which is interpreted by the interpreter comprises commands such as Answer, for answering a telephone coupled to the computer. A Say command causes the voice synthesizer to speak what follows the Say command in delimiters (quotes). A Key command is used to enter keystrokes and to select and provide commands to the particular application. An Input variable is used to contain values of the touch tones received from a remote user.

With the above selected commands from the high level language, the use is able to write a program to interface between a telephone at a remote location and an application to be run on a computer. The user can receive voice communications from the computer independent of the application. Use of the voice function is extremely versatile and not limited by the applications chosen. The ability to provide unlimited commands to the application overcomes the limits imposed by prior systems which were hard coded or written into the application resulting in use of the function in a limited manner.

In the preferred embodiment, the language allows a user to indicate keystrokes needed to obtain a particular screen of an application and then initiate such key strokes by touch tone. A user preprograms several different series of keystrokes to perform different tasks in different applications, the particular task being chosen by predetermined touch tone. A speech synthesizer is then used to read a portion of the particular screen of the application identified by the keystrokes. The portion to be read is also identified by the high level language. Different portions can be read in response to preprogrammed touch tones.

In further preferred embodiments, other functions, such as voice command input, touch screen input, voice playback, etc., are provided merely by adding commands to the high level language representative of the functions. Since the high level language is executed on top of the applications to which such functions are designed to apply, the further functions are also independent of the applications.

BRIEF DESCRIPTION OF THE DRAWINGS

FIG. 4 is a simplified block diagram demonstrating the flow of commands from an application program across the application programming interface through the host processing system to the signal processing system.

DESCRIPTION OF THE PREFERRED EMBODIMENT

To understand the present invention in detail, it is first necessary to review the voice operating subsystem described as the signal processing system in a related application Ser. No. 786,913, filed Oct. 11, 1985 and entitled Hardware Resource Management. A reader wishing to skip this portion of the description and move directly to the functioning of the interpreter program should skip to the description starting with FIG. 5.

Figure 1:
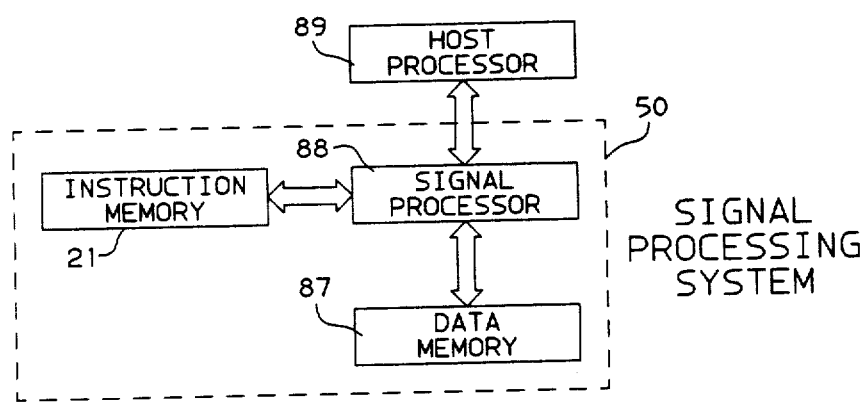
FIG. 1 is a simplified functional block diagram of the signal processing system attached to a host processor using the present invention.

A simplified functional block diagram of the signal processing system 50 is shown in FIG. 1. Signal processor 88 may be any commercially available signal processor such as the Texas Instruments TMS32010. Signal processor 88 is totally controlled by host processor 89, such as a IBM Personal Computer (hereinafter PC), and must have its central processing unit (CPU) instructions loaded before operation. Signal processor 88 uses instruction memory 21 as well as data memory 87. Both of these memories are accessible by host processor 89 although not at the same time as signal processor 88. Instructional memory 21 is accessible by host processor 89 only when signal processor 88 is turned off, i.e., reset. At that time, host processor 89 can load from instruction memory 21 and then switch to data memory 87 which is shared at all times dynamically with signal processor 88. Both signal processor 88 and host processor 89 have the capability to interrupt one another with interrupt masking under control of host processor 89.

Figure 2:
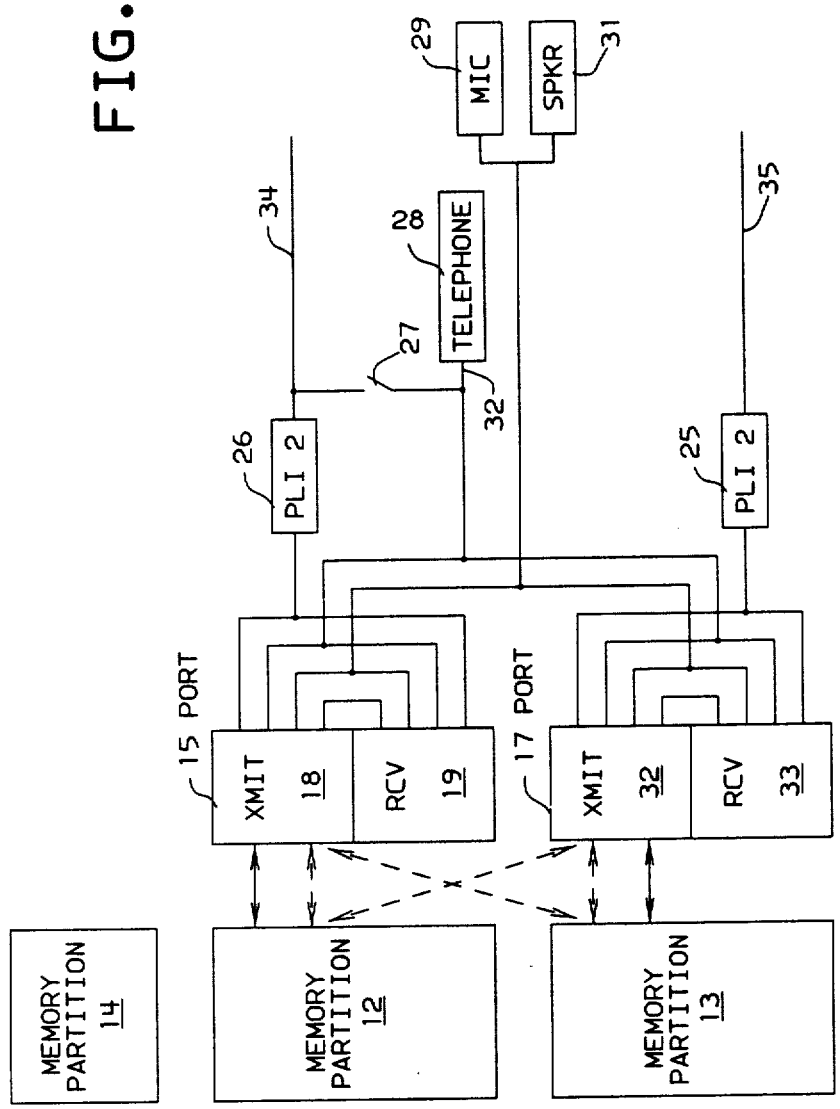
FIG. 2 is a block diagram of the hardware resources of the signal processing system.

The resources available to the signal processing system are shown in FIG. 2. Partitions 12, 13, and 14 are contained within instruction memory 21 (see FIG. 3). Partition 14 is loaded when the processing system is initialized and provides functions to manage the resources of the signal processing system. Partition 12 may contain either the telephony or line monitoring function sets. The telephony function set provides the capability to dial phone multiplexed through ports 15 and 17 which are in turn multiplexed to a single pair of A/D and D/A convertors. The A/D and D/A conversion does not form a part of this invention and will not be discussed further hereinafter. Ports 15 and 17 can be accessed by either partition 12 or 13. Additionally, both partitions 12 and 13 can access the same port.

In addition to the hardware resources previously mentioned, there are three interrupt resources which an application can use. The first two interrupt resources are ring-in interrupts on lines 34 and 35 respectively. The third interrupt resource is the telephone handset on/off cradle which is provided by line 32.

Figure 3:
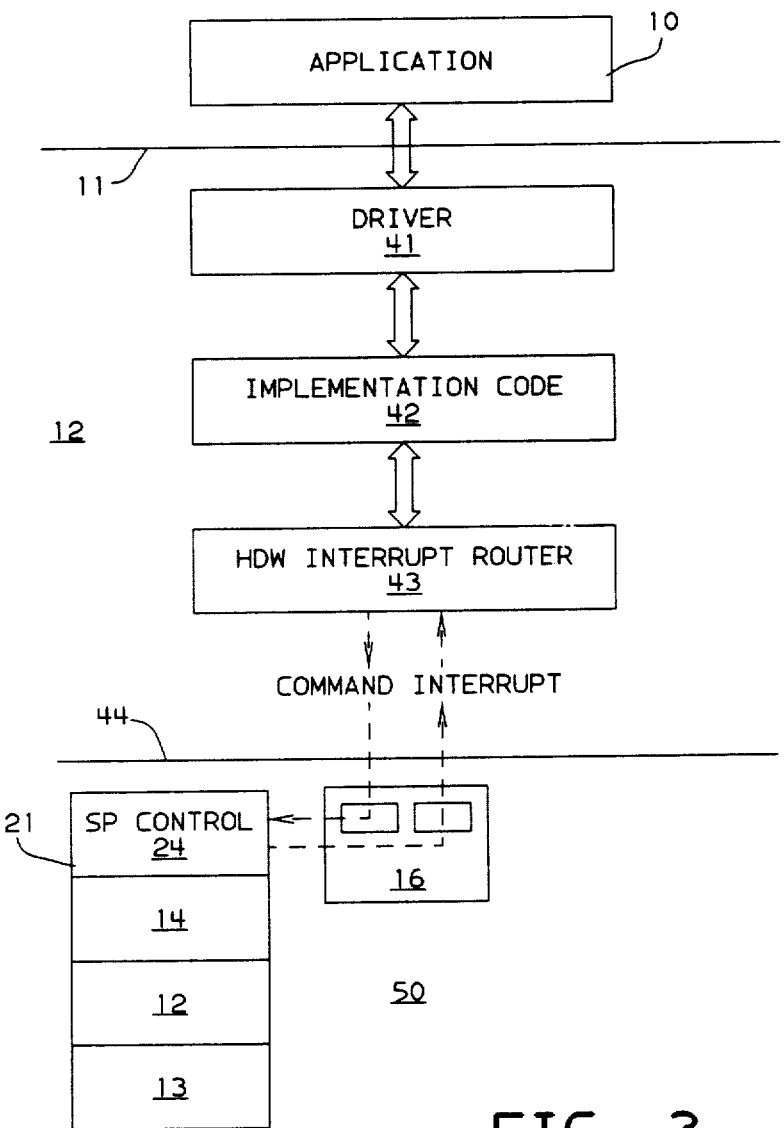
FIG. 3 is a functional block diagram of the overall system using the present invention.

FIG. 3 shows in simplified functional block form the flow of commands and interrupts. Application 10 interacts across the programming interface 11 and driver 41, implementation code 42 and hardware interrupt router 43, each of which is located in host processing system 89. Hardware interface 44 forms the boundary between host processing system 89 and signal processing system 50. Application commands terminate in partition 24 of instruction memory 21, while interrupts originate in partition 24. Partition 24 contains the signal processor control program. This control program manages instruction memory 21 in partitions 12, 13, and 14 and allows the signal processing code in partitions 12, 13, and 14 to run concurrently, thereby sharing the resources of the signal processing system 50. The flow of commands and interrupts which define programming interface 11 will now be explained in more detail with reference to FIGS. 3 and 4.

FIG. 4 details the flow of commands from application 10 across interface 11 through host 89 and to signal processing system 50. The commands which are input from application 10 to interface 11 contain two types of identification. The first type of identification provided is the function set that is to be used and this identification selects the appropriate control block 51 which in turn accesses the implementation code 42. The second type of identification is of the particular command within a given function set. The driver 41 takes these commands and then passes them on to the appropriate locations in implementation code 42. The select control block information which is part of the command input to interface 11 and driver 41 identifies a particular control block 51. This control block 51 contains a pointer block 71 which points to the beginning of command vector block 52. The command code information contained in the command is output over line 72. Together with the pointer information from pointer block 71, the command code points or indexes to the particular location in command vector 52 to which this command is pertinent. After execution, command vector 52 points to a specific piece of implementation code in command processor 53. Having found the particular piece of code required, drive 41 then passes control to command processor 53 which contains required code. In effect, command vector 52 along with the command code issued over line 72 and pointer block 71 perform an addressing function. Command processor 53 then implements the particular command which has been output from application 10 to hardware system 50.

FIG. 5 Description

Additional description of application signal processing by host processor 89 and signal processor 88 is found in the above mentioned related patent application Ser. No. 786,913 filed Oct. 11, 1985, and titled Hardware Resource Management. The present invention can now be described in this environment as an interpreter that allows an application program working across the application program interface to interact with an operating system (signal processing system) to perform an advanced function without modification of the application program.

In the preferred embodiment, a voice operating subsystem program that performs text-to-speech synthesis operates with an IBM Enhanced 5250 Emulation application program. The program interaction is supervised through an interpreter to allow a remote user to interact by voice and tones over telephone lines with a System 36 through a PC used as an intelligent terminal (host processor 89) as if the user was at an IBM 5250 terminal on a System 36.

Figure 5:
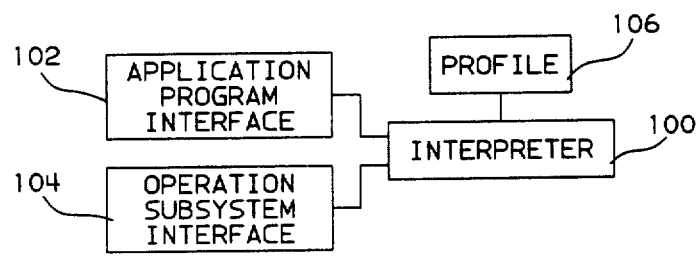
FIG. 5 is a simplified block diagram indicating command and parameter flow between the interpreter program, the profile for the interpreter and the interfaces for the application program and the operating subsystem program.

FIG. 5 shows how the interpreter fits into a program system consisting of the interpreter program 100, an application program (terminal emulator) interface 102, an operating subsystem (advanced function voice) interface 104, and a profile 106. The interpreter is a program, which runs in the intelligent terminal or workstation (a PC), and it ties together the terminal emulator interface 102 and an advanced function voice interface 104.

Both the terminal emulator interface and the advanced function voice interface are low level application program interfaces which allow very fine control of the operating subsystem and the terminal emulator. What the interpreter 100 does is convert a high level language description given in the profile 106 into these low level commands.

Figure 6:
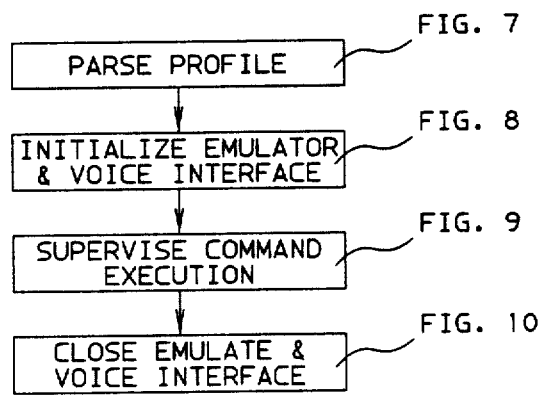
FIG. 6 is a high level flow diagram of the interpreter program.

The interpreter program flow in FIG. 6 consists of four main steps. The first one is parse the profile. This sets up a standard structure for all the profile commands so that they can be processed by a supervise command execution step later on. It allows basically a free form of input including comments and sets up a structure for processing commands.

The second step initializes the emulator and voice interfaces. First the program makes sure that the interfaces are there, then it goes ahead and gets the interfaces set up to running all the commands needed.

The third step is supervising the execution of functions by the terminal emulator of the voice operating subsystem using commands created from the parsed profile. This step goes through the commands in sequence to supervise the execution of the required functions. An example would be if the command is KEY, it will send the appropriate series of keystrokes on to the terminal emulator interface.

Figure 7:
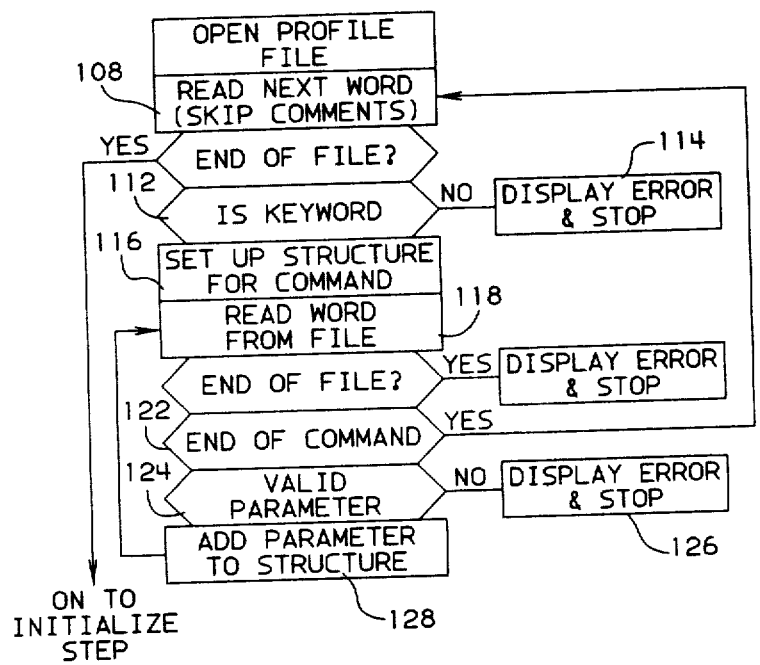
FIG. 7 is a flow diagram of the parse profile portion of the interpreter program of FIG. 6.

FIG. 7 shows how the profile parsing works. The very first thing that is done is that the profile is opened using a standard operating system command. Step 108 then reads a word in the profile, a word that is delineated by spaces. If the program comes across the end of a file it just goes on to the next step in processing which is described under FIG. 8. It it is not the end of a file, decision 112 determines if the word that was found is the keyword. If this word is not a keyword step 114 displays and error an stops processing right there. If the work was a keyword, step 116 sets up a structure for the command represented by that keyword.

Once this structure is set up it continues to read through the file, step 118. If the program runs across an end of file while this is happening, it means that an error has occurred because the end of file should only occur between keywords. It should never occur while in the middle of processing a keyword.

Decision 122 checks to make sure that we are not at the end of the command. Commands for this particular profile language are delineated by semicolons. If it is not a semicolon it goes on and checks to make sure that there is a valid parameter at decision 124. If so, step 128 adds the parameter to the structure along with any descriptives for that parameter and control is passed to step 118. If the program comes across a parameter keyword that is not valid for the current command, step 126 displays an error and stops.

Figure 8:
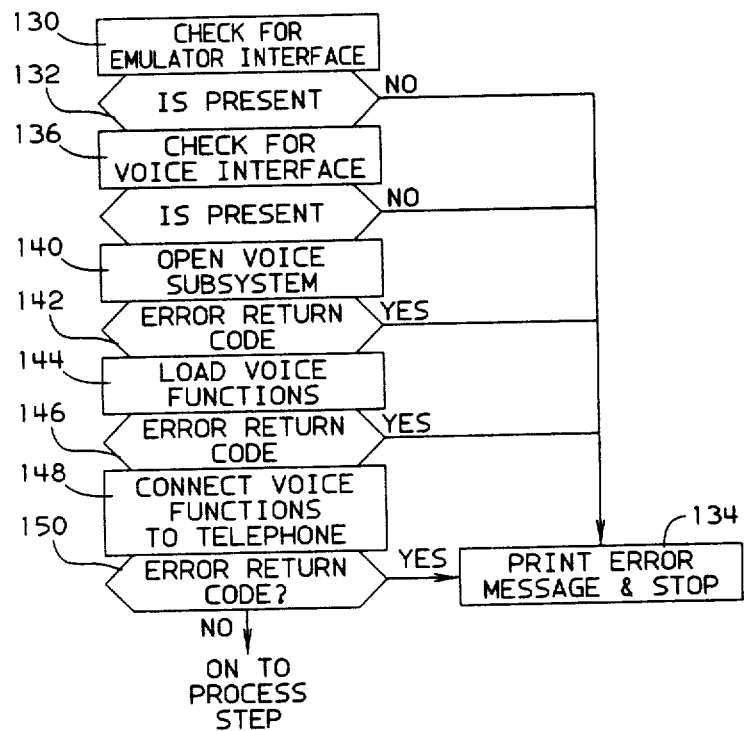
FIG. 8 is a flow diagram of the initialization portion of the interpreter program of FIG. 6.

The initialization routine shown in FIG. 8 initializes the emulator application program and voice operating subsystem. Step 130 checks to make sure that the emulator is present. This is done by a command given in the emulator documentation. If the emulator is not present, decision 132 branches to step 134 to print an error message and stops the program. If the emulator is present, step 136 checks that the voice subsystem is present following documentation given for the voice interface. If it is not present the error message is printed and the program stops. If it is present, the step 140 opens the voice subsystem. While opening the voice subsystem, the subsystem may return an error code. If so, decision 142 stops the program at step 134. If the voice subsystem was opened without a return code, step 144 loads the voice functions and makes sure they they are ready to go. Decision 146 checks for the return code. If the return code indicates an error, step 134 prints an error message and stops, otherwise control goes on and step 148 connects the voice functions to the telephone line. Decision 150 checks the error return code one more time.

Figure 9:
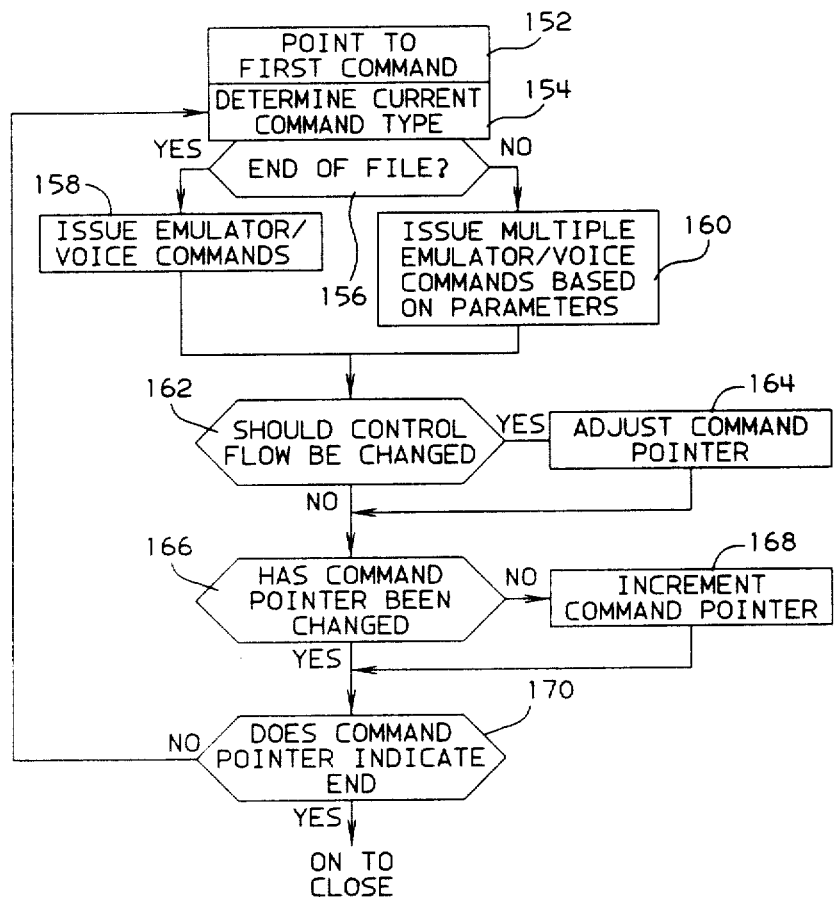
FIG. 9 is a flow diagram of the supervise execution portion of the interpreter program of FIG. 6.

FIG. 9 is a flow diagram of the program for supervising execution of commands created by the parsed profile. First of all step 152 points to the first command in the list of command structures. Step 154 determines the command types. There are two basic types of commands distinguished by decision 156. A very simple one which consists of one function to be sent to either the terminal emulator or the voice interface subsystem. These commands are supervised by procedures represented by block 158. The other type of command is a multiple or more complex command which consists of multiple emulator and voice functions. The more complex commands have lists of parameters describing exactly which functions will be used and in what order to use them. These coplex commands are supervised by procedures represented by block 160.

After the appropriate emulator and voice commands have been sent, decision 162 determines if the control flow should be changed. Step 164 adjusts the control flow according to parameters in profile commands.

Next decision 166 determines if the command pointer has been changed. If not, step 168 increments the command pointer to the next instruction. The next comparison at decision 170 checks if the command pointer indicates the end of the file. If it does not, control is passed back to step 154. If the command pointer indicates that the program is at the end of the command list, control goes on to closing down program.

Figure 10:
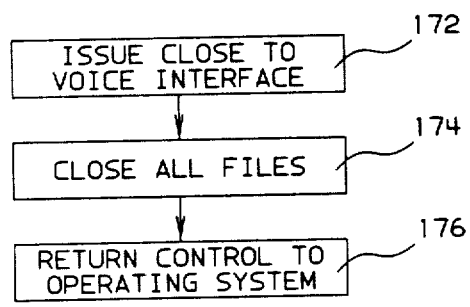
FIG. 10 is a flow diagram of the close down portion of the interpreter program of FIG. 6.

FIG. 10 shows closing down the flow of the interpreter program. First step 172 issues a close to the voice subsystem interface to free up all the hardware for the next program. Step 174 closes all the files that have been left open, if there have been any left open, and step 176 returns control to the operating system.

In describing the operation of this preferred embodiment command and function definitions will be helpful. The functions that define the interface protocol for the IBM Enhanced 5250 Emulator Program are in Appendix A of the User Guide Manual (#G570-2202-0) for that program. The commands for the interpreter profile are defined in Appendix A2 while a listing of a sample profile with comments is in Appendix A1. The functions that define the voice subsystem interface protocol are as follows:

Base Function Set:

OPEN

Allocates a Resource Control Block (RCB) and starts access to card. The card address is passed to this function and the RCB and Base and Connection Identifiers are returned.

CLOSE

Closes access to the voice operating subsystem. The RCB is passed to the function.

ESTINT

Establishes an interrput routine. The parameters passed to this function include the interrupt to be trapped and the address of the routine to handle the interrupt.

MASKINT

Enables the trapping of interrupts. The interrupts to be handled are passed to this function.

READSTAT

Reads the current status of the RCB. The RCB to be read is passed to this function and the values of interrupt which have had a status change since the last READ-STAT are returned.

READCONN

Returns a list of the current function connections for the RCB. It also returns a list of any devices connected to the given RCB.

CLAIMHDW

Claims the devices specified in a list for the given RCB. This function returns a code which indicates if any of the devices had to be seized from another application.

OPTSET

Loads a specified function set from disk into memory. It returns a code indicating whether the function set could be loaded.

CONNFTOP

Connects a specified function set to a specified port. The port must be available for the function set to be connected.

DCONFFRP

Disconnects a specified function set from a specified port. This function frees the port for another function set.

CONNDTOP

Connects an already claimed device to a specified port. The device and port are specified when the function is called.

CONNDEVS

Connect devices together. The devices must have been claimed by the application previously.

DCONDEVS

Disconnects devices which are connected together. At least one of the devices must have been claimed by the application.

ONHOOK

Place the telephone line "On Hook". This function causes the specified line to be placed in a "Hung Up" state.

OFFHOOK

Place the telephone line "Off Hook".

Line Monitoring Function Set:

This function set uses the functions ESTINT, MASKINT, and READSTAT. These functions perform the same services as the base function calls of the same name on a set of line monitoring interrupts including detection of an incoming ring, busy signal, and dial tone. It can also set interrupts based on incoming Dual Tone Multiple Frequency (DTMF) signals.

Text-to-Speech Function Set:

INIT

Initializes the Text-to-Speech (TTS) function set. The function set must have been loaded and connected to a port prior to issuing this command.

FLUSH

Flushes the TTS buffer. This function is needed to remove any unspoken text from the buffer after the TTS function has been PAUSEd.

PAUSE

Stop the conversion of text to speech. This function allows voice production to be stopped by the controlling program.

SPEAK

Convert an ASCII text string to speech. The text string is passed to the function and speech is produced.

The operation of the interpreter will be briefly reviewed by examining the two types of commands that occur with the profile. In addition, the parsing of the profile will also be illustrated with the first example.

To illustrate the operation of parsing, the profile file is opened in FIG. 7 and step 108 is reading through until it finds a keyword such as SAY. Decision 112 branches to step 116 which sets up a place for the text string, a parameter in the SAY command. Step 118 reads the text string from the profile and step 128 adds this parameter (text string) to the command structure for execution by supervising portion of the program (FIG. 9).

This particular SAY command which is near the beginning in the profile listing (Appendix A1) says "Hello, this is telephone access PS36". It only has one parameter which is the quoted string. The semicolon at the end of the line indicates the end of the command and, once the program hits the semi-colon, it goes on to look for the next keyword.

The validity of the parameter was checked at step 124. It is valid because it consists of a quoted string, a string of characters with a double quote at each end. Other valid parameters for the SAY keyword include application display sceen areas which are indicated by square brackets enclosing the desired row, column and length.

When the parse has been completed for all commands in the profile, the entire list of command structures is stored away in the PC memory while the emulator program and the voice subsystem are initialized as illustrated in FIG. 8.

The SAY command is processed according to FIG. 9. When the command pointer is pointing toward the SAY command decision 156 determines that SAY is a simple type of command and sends the text string on to the voice subsystem interface using the SPEAK function. Step 168 increments the command pointer and decision 170 verifies that the command pointer does not indicate the end of the whole profile.

The WAIT command is an example of a more complex command. When the command type is determined by decision 156, step 160 can issue multiple emulator or voice function calls. The WAIT command labeled "1:" in the profile listing Appendix A1 has several options available to it. First, it issues a GETSCREEN function call to the emulator. It looks at the emulator screen using the emulator function, compares the value in the first row to the string "MAIN."If they match, the command pointer is adjusted in step 164 to go to command at label "5:" and control loops through 170, 154, 156 and back to block 160. The MENU command associated with the label is processed in block 160. This process repeats until a simple type command is encountered.

While the invention has been particularly described with a particular application program and operating subsystem in mind, it will be appreciated by one skilled in the art that the profile and the interpreter program could be altered to arrive at equivalent processes to modify other application programs with other operating systems. For example, a touch screen operating subsystem could be operated with existing application programs such as word processing and spread sheet processing by following the flow and structure of the interpreter program and generating a profile to be operated on by the interpreter program. The choices are almost endless.

APPENDIX A1    PS36.PRO
    © Copyright IBM Corp. 1985

```
/* The first statement defines a table of user information.  It includes the
   file name and the various fields within the file.                       */

Table "USERS.LST" [&AccessNm] 8 [&Name] 20 [&UserID] 8 [&Greeting] 40;

/* These two statements control time-out and hang-up conditions.  They indicate
   the time allowed and the statement to receive control when the condition
   occurs.                                                                 */

TimeOut(10, 89);
   dialtone(3, 78);

/* This is the beginning of the real processing.  The first statement tells
   the workstation to wait until the telephone rings before it does anything. */

0: Ring;

/* This statement makes sure that the host computer is in a known state before
   the actual processing begins. */

Wait("SIGN ON" in [1,*] {},
        If("MAIN" in [1,*] { Key("OFF   "[Enter]), Delay(1) }
           []                { Key([PF7]), Delay(1) } ) );

/* The next two statements answer the telephone and greet the caller. */

Answer;
   Say("Hello, this is telephone access to PS 36.");

/* The next group of statements ask for and receive the callers identification
   number and determine if it is a valid user. */

2: Say("Please enter your access number "
        "followed by a pound sign.");
    Get(N#,10,2);
    Say("Thank you.");
    LookUp([Input] = [&AccessNm], 79);

/* If it is a valid user number processing continues here.  Otherwise control
   is passed to the statement with a label of 79.  The next group of statements
   perform the logon to the host computer.  They also receive and enter the
   user's password. */

Key([Enter]);
    Delay(1);
    Key([&UserID]);
    Say("Hello "[&Greeting]", ");
 3: Say("Please enter your password "
        "followed by a pound sign.");
    Get(A#,10,3);
 7: Say("Your logon is now being completed.");
    Key([Input][Enter]);
    Delay(1);

/* After the password has been entered , the next statements verify that the
   logon was correct.  If not the password is asked for again. */

1: Wait("MAIN" in [1,*] { Goto(5) }
         [24,2,8] = "SYS-5521" { Say("The password entered was not correct."),
                                 Key([newline]), Goto(3) }
         "Enter" in [23,*] {});

/* If there are any messages waiting for the user they are handled here. */

ReadItem(3,5,3, If([] {Say("There are "[Count]" messages on this page.")}),
                    Until([#,*] = " "),
                    [] {Say("Message "[Current]" is from "[#,10,8,c]
                        ", it was sent on "[#,46,2,m]" "[#,49,2,z]", 19"
                        [#,52,2]" at "[#,69,5]".  The message is: "
                        [#2,1,80,c]".") } );
```

```
        Say("You may press the asterisk key at any time to skip a prompt.");
        Menu(0,5,10,Say("Press 1 to re-read the messages or 2 to continue."),
            [Input] = "1" { ReRead }
            [Input] = "2" { Key([Enter]), Delay(1), Goto(1) }
            []             { Say("That key is not valid.")});

/* This is the main user menu. A tone is received and control is passed
   to the correct procedure. */

5:    Menu(0,5,10,Say("Press 1 to check your calendar, "
                      "Press 2 to read your mail or press 0 to sign off."),
            [Input] = "1" {Say("Checking the calendar."),
                           Key("ofccal work"[Enter]), Goto(10) }
            [Input] = "2" {Say("Checking the mail."),
                           Key("ofcmail .receive"[Enter]), Goto(20)}
            [Input] = "0" {Say("Signing you off the system."),
                           Key("off "[Enter]), Goto(99) }
            []            {Say("That is an invalid key.")} );

/* This is the set of calls to handle calendar processing. First the correct
   screens are chosen, then a variable is set to the current date.        */

10:   Wait([Inhibit] = "no" {});
      Key([PF2]);
11:   Wait([Inhibit] = "no" {});
      Set(1,[1,6,8]);

/* The calendar is introduced. */

Say("The calendar is for: "[1,2,3,d]", "
          [1,6,2,m]" "[1,9,2,z]", 19"[1,12,2]".");
      Key([PF4]);
      Wait([Inhibit] = "no" {});

/* The calendar is read. */

ReadNote(4,19,4,19,100,
               If([Count] = "0" { Say("There is nothing on your calendar"
```

APPENDIX A1                    PS36.PRO

```
                                           " for this date.") } ),
               Page(Key([ROLL UP]), Delay(2), [24,2,6] = "**Last"),
               [24,2,6] = "**Last" {}
               [#,*]    = " "      {}
               [#,6,3]  = "Sub"    { Say("The subject is: "[#,16,30,c]". The "
                                         "location is: "[#,55,25]".") }
               [#,6,3]  = "Not"    { Say("Note: "[#,16,60,c]".") }
               [#,6,3]  = "Rem"    { Say("The reminder is: "[#,16,60,c]".") }
               [#,6,3]  = "Pro"    { Say("The program is: "[#,16,60,c]".") }
               [#,13,8] <> [%1]    { Skip([#,*] = " ") }
               [#,57,8] = "Reminder" { Say("Item "[#,3,2,z]" is a "[#,40,10]
                                          " Reminder.") }
               [#,58,8] = "Program"  { Say("Item "[#,3,2,z]" is a "[#,40,10]
                                          " Program.") }
               []                    { Say("Item "[#,3,2,z]" is a "[#,40,10][#,56,12]
                                          ". It is scheduled from: "
                                          [#,24,5,z]" "[#,29,1]"M to "
                                          [#,31,5,z]" "[#,36,1]"M.") } );
      Key([PF2]);
      Wait([Inhibit] = "no" {});

/* The calendar choice menu is presented. */

Menu(0,5,10,Say("Press 1 to re-read the schedule, "
                      "2 for the previous day, "
                      "3 for the next day, "
                      "4 to enter a specific date, "
                      "or the pound sign to return to the main menu."),
            [Input] = "1" { ReRead }
            [Input] = "2" { Say("Changing to the previous day."),
                            Key([PF12]), Goto(11) }
            [Input] = "3" { Say("Changing to the next day."),
                            Key([PF11]), Goto(11) }
```

```
        [Input] = "4"    { Goto(12) }
        [Input] = "#"    { Say("Returning to the main menu."),
                           Key([PF7]), Goto(1) }
        []               { Say("That is an invalid key.") } );
```

/* A specific date can be entered. */

```
12: Say("Please enter six digits for the date.  Two for the month, "
        "two for the day, and two for the year.");
    Get(N6,10,12);
    Key([Enter]);
    Delay(1);
    Key([Input]" "[Enter]);
    Wait([Inhibit] = "no" {});
    If([24,2,13] = "**Date is inc" {Say("The date is not valid."),
                                    Goto(12)});
    Goto(11);
```

/* This is the set of procedures to handle reading the user's mail.
   First we determine the correct screen. */

```
20: Wait("REVIEW" in [1,*] { Goto(22) }
         "PASSWORD" in [1,*] {Say("There are personal documents in your "
                                  "mail.")} );
```

/* If an additional password is needed, it is added here. */

```
23: Say("Please enter your personal document password followed by a pound "
        "sign.  Just press the pound sign to omit personal documents.");
    Get(A#,15,23);
    Say("Thank you.");
    Key([Input][Enter]);
    Wait("REVIEW" in [1,*] { Goto(22) }
         [24,2,13] = "**You did not" { Say("You did not enter the correct "
                                           "password."), Goto(23) } );
```

/* The actual list of received mail is read. */

```
22: Wait([Inhibit] = "no" {});
    If([12,*] <> " " {Key("         "[ENTER]) } );
    Wait([Inhibit] = "no" {});
    ReadItem(12,10,1,If([Count] = "0" { Say("There is no mail.") }
                       []              { Say("There are "[Count]" items on this"
                                              " page.") } ),
             Until([#,56,2] = " "),
             [] { Say("Item "[Current]" is from "[#,65,8,c]".  The subject is: "
                      [#,9,30]".") } );
```

/* The mail handling menu is presented. */

```
    Menu(0,5,10,Say("Press an item number to look at an item.  The 0 key to "
                    "page forward.  The star key to page back, or the pound"
                    "key to return to the main menu."),
        [Input] = "#"      { Say("Returning to the main menu."),
                             Key([PF7]), Goto(1) }
        [Input] = "*"      { Say("Paging back."), Key([Roll down]), Goto(22) }
        [Input] = "0"      { Say("Paging forward."), Key([Roll up]), Goto(22) }
        [Input] > [Count]  { Say("That key is not valid now.") }
        [Input] = "1"      { Key("2"[Enter]), Goto(21) }
        [Input] = "2"      { Key([Newline]"2"[Enter]), Goto(21) }
        [Input] = "3"      { Key([newline][Newline]"2"[Enter]), Goto(21) }
        [Input] = "4"      { Key([newline][newline][Newline]"2"[Enter]),
                             Goto(21) }
        [Input] = "5"      { Key([newline][newline][newline][newline]
                                  "2"[Enter]), Goto(21) }
        [Input] = "6"      { Key([newline][newline][newline][newline][newline]
                                  "2"[Enter]), Goto(21) }
        [Input] = "7"      { Key([newline][newline][newline][newline][newline]
                                  [newline]"2"[Enter]), Goto(21) }
        [Input] = "8"      { Key([newline][newline][newline][newline][newline]
                                  [newline][newline]"2"[Enter]), Goto(21) }
        [Input] = "9"      { Key([newline][newline][newline][newline][newline]
                                  [newline][newline][newline]
                                  "2"[Enter]), Goto(21) }
```

```
                    [ ]                 ( Say("That key is not valid now.") } );

/* The chosen document is opened. */

21: Say("Getting the document.");
    Set(1,[Input]);
    Wait("MEMO" in [1,*] { Goto(27) }
        [24,2,10] = "**There is" ( Say("There is not a memo slip attached."),
                                    Goto(28) }
        "PASSWORD" in [1,*] (Say("That is a personal document.") }
        [24,2,2] = "**" (Say([24,4,68,c]"."), Goto(22) } );

/* If an additional password is needed, it is added here. */

24: Say("Please enter your personal document password followed by a pound "
        "sign.  Just press the pound sign to omit the document.");
    Get(A#,15,24);
    Say("Thank you.");
    Key([Input][Enter]);
    Wait("MEMO" in [1,*] ( Goto(27) }
        [24,2,5] = "**All" (Say("Personal document is being skipped."),
                            Goto(22) }
        [24,2,10] = "**There is" ( Goto(28) }
        [24,2,13] = "**You did not" ( Say("You did not enter the correct "
                                          "password."), Goto(24) } );

/* If there is an attached memo, it is handled. */

27: Say("There is a memo attached.");
    If([12,8,1] = "X" (Say("For your information.") }
       [13,8,1] = "X" (Say("For your comments.") }
       [14,8,1] = "X" (Say("For your signature.") }
       [15,8,1] = "X" (Say("For your approval.") }
       [12,46,1] = "X" (Say("Please handle.") }
       [13,46,1] = "X" (Say("Please circulate.") }
       [14,46,1] = "X" (Say("Please see me.") }
       [15,46,1] = "X" (Say("Please prepare reply.") } );
    Say("Remarks: "[17,15,62,c][18,4,73,c][19,4,73,c]".");
    Key([PF3]);
    Say("Getting the document.");

/* The actual document is chosen */

28: Wait("REVIEW" in [1,*] ());
    If([12,*] <> " " (Key("            "[ENTER]) } );
    Wait([Inhibit] = "no" ());
    If([%1] = "1"    ( Key("1"[Enter])}
       [%1] = "2"    ( Key([Newline]"1"[Enter])}
       [%1] = "3"    ( Key([newline][Newline]"1"[Enter])}
       [%1] = "4"    ( Key([newline][newline][Newline]"1"[Enter])}
       [%1] = "5"    ( Key([newline][newline][newline][newline]
                            "1"[Enter])}
       [%1] = "6"    ( Key([newline][newline][newline][newline][newline]
                            "1"[Enter])}
       [%1] = "7"    ( Key([newline][newline][newline][newline][newline]
                            [newline]"1"[Enter])}
       [%1] = "8"    ( Key([newline][newline][newline][newline][newline]
                            [newline][newline]"1"[Enter])}
       [%1] = "9"    ( Key([newline][newline][newline][newline][newline]
                            [newline][newline][newline]
                            "1"[Enter])} );
    Wait("EDIT" in [1,*] ( Goto(25) }
        "PASSWORD" in [1,*] (Say("That is a personal document.") }
        [24,2,2] = "**" (Say([24,4,68,c]"."), Goto(22) } );

/* If an additional password is needed, it is added here. */

26: Say("Please enter your personal document password followed by a pound "
        "sign.  Just press the pound sign to omit the document.");
    Get(A#,15,26);
    Say("Thank you.");
```

```
      Key([Input][Enter]);
      Wait("EDIT" in [1,*] { Goto(25) }
           "REVIEW" in [1,*] (Say("Personal document is being skipped."),
                              Goto(22) }
           [24,2,13] = "**You did not" { Say("You did not enter the correct "
                                             "password."), Goto(26) } );

/* The document is read. */

25: ReadNote(3,19,4,19,100,Page(Key([Roll Up]), Delay(1),
                                [1,41,8] = "page end"),
           [#,*] = " " {}
           []          {Say([#,*])} );

/* The document menu is read. */

Menu(0,5,10,Say("Press 1 to re-read the document or "
                    "press the pound sign to return."),
         [Input] = "1" { ReRead }
         [Input] = "#" { Say("Returning to the mail list."),
                         Key([PF7]), Goto(22) }
         []            { Say("That is an invalid key.") } );

/* If the user hangs up it is handled here. */

78: if("SIGN ON" in [1,*] { Goto(98) });
    Wait("MAIN" in [1,*] {}, If([] { Key([PF7]), Delay(2) } ) );
    Key("off "[Enter]);
    Wait("SIGN ON" in [1,*] { Goto(98) },
         If("Enter" in [23,*] {Key([Enter])}));

/* Processing for an incorrect access number. */

79: Say("That access number was not recognized.");
    GoTo(2);

/* Host computer is having a problem. */
89: Say("There is a problem with the host computer.");
    Goto(98);

/* Log the user off the computer. */

99: Wait("SIGN ON" in [1,*] { Goto(98) }
         "Enter" in [23,*] {});
    ReadItem(3,5,3, If([] (Say("There are "[Count]" messages on this page."))),
              Until([#,*] = " "),
              [] (Say("Message "[Current]" is from "[#,10,8,c]
                      ", it was sent on "[#,46,2,m]" "[#,49,2,z]", 19"
                      [#,52,2]" at "[#,69,5]". The message is: "
                      [#2,1,80,c]".") } );
    Menu(0,5,10,Say("Press 1 to re-read the messages or 2 to continue."),
         [Input] = "1" { ReRead }
         [Input] = "2" { Key([Enter]), Delay(1), Goto(99) }
         []            { Say("That key is not valid.")});

/* Say goodbye to the user, hang-up, and get ready for the next caller. */

98: Say("Goodbye.");
    HangUp;
    Goto(0);
```

APPENDIX A2          © Copyright IBM Corp. 1985                    Page 1

THE PROFILE LANGUAGE

The profile language consists of two types of statements:

- Initial Statements

- Processing Statements.

There are three initial statements and eighteen processing
statements that comprise the language. The initial statements
are unique in the sense that they must be the first lines found
in the profile. The rest of the statements in the profile are
processing statements which perform most of the work. Both
types of statements can begin in any column and must end with a
semicolon (;). Throughout the rest of this appendix you will
find the syntax, descriptions, and examples of:

- The Initial Statements

- The pre-defined variables associated with the processing
  statements, called Control Words

- The Processing Statements.

No alphabetic letter in the profile language is case specific,
but when showing the syntax of a statement, key words are
capitalized and parameters are italicized.

THE INITIAL STATEMENTS

The initial statements which must be the first statements in the
profile, are also order specific. Below, listed in their
correct processing order, are the three initial statements.
Each is followed by its description and an example:

- TABLE *filespec* [&*name1*] *len1* [&*name2*]
  *len2* ...;

This statement is used by the USERLIST program and defines
  the list of authorized users. The filespec parameter is the
  drive, path, filename, and file extension of the user list
  and is enclosed in double quotes. There is one field name
  and length parameter pair for each field in the user list.
  Each field name must be unique and begins with an ampersand
  (&) followed by 1 to 8 characters. The associated length
  parameter is the number of characters needed for the field.

Example:

TABLE "USERS.LST" [&AccessNo] 8
          [&Name] 20 [&UserID] 8
          [&Greeting] 40;

In this example, USERS.LST is the filespec of the authorized
  user list, and to describe each system user in the list are
  the following fields:

- AccessNo with a maximum length of 8 characters

- Name with a maximum length of 20 characters

- UserID with a maximum length of 8 characters

- Greeting with a maximum length of 40 characters.

- SESSION *character*;

This statement names the host session containing the host
  system being used with &voice.. The host session is either
  1 or 2. If this statement is omitted, the second 5250
  session is used if it is a host display session, otherwise,
  the first host display session is used.

Example: SESSION 1;

In this example, the host system being used with &voice is located in the first session of a PC running the IBM Enhanced 5250 Emulation Program.

- ADDRESS number;

This statement is used to select the correct port address of the &pechw., since it is user-definable. The address should be given in decimal. If this statement is omitted, the default address of the &pechw is used.

Example: ADDRESS 256;

In this example, the &pechw will be located at port address Hex 0100.

CONTROL WORDS OF THE PROCESSING STATEMENTS

The processing statements make extensive use of text strings. A text string consists of standard ASCII characters enclosed in double quotes and control words enclosed in square brackets ([]). The control words define:

- Special keys normally found on the host computer terminal, called emulation control words

- Positions on the screen where text can be read, called screen position control words

- Variables to which you have access, called variable control words.

Emulation Control Words

Emulation control words define the special purpose keys found on the host computer terminal. They are used when sending keystrokes to the host system. Following is a list of the emulation control words:

| | |
|---|---|
| [ATTENTION] | [BACKSPACE] |
| [BACKTAB] | [DELETE] |
| [DOWN] | [DUP] |
| [ENTER] | [ERASE INPUT] |
| [FIELD EXIT] | [FIELD+] |
| [FIELD-] | [HELP] |
| [HOME] | [INSERT] |
| [LEFT] | [NEW LINE] |
| [PF1] | [PF2] |
| [PF3] | [PF4] |
| [PF5] | [PF6] |
| [PF7] | [PF8] |
| [PF9] | [PF10] |
| [PF11] | [PF12] |
| [PF13] | [PF14] |
| [PF15] | [PF16] |
| [PF17] | [PF18] |
| [PF19] | [PF20] |
| [PF21] | [PF22] |
| [PF23] | [PF24] |
| [PRINT] | [RESET] |
| [RIGHT] | [ROLL DOWN] |
| [ROLL UP] | [SYS REQUEST] |
| [TAB] | [UP] |

Note: The IBM Enhanced 5250 Emulation Program command keys are accessed by the appropriate PF key.

Screen Position Control Words

The screen position control words set the screen row and column, and length of a series of characters to be read from the screen. They also control any special processing of the characters. Within a screen control word, there are two special symbols used for locating text on the screen:

- ✱ means the entire line

- # means use the current line.

There are four special processing operators that are used for text translation:

- C is used for adjusting the case of the letters on the screen. If any letters in the character string located on the screen are in lower case, the string is left alone. If the string is entirely upper case, the entire string is converted to lower case. This operator is used for pronouncing words found in upper case. If the C operator is not used, words that are entirely in upper case are spelled instead of pronounced.

- D is used for pronouncing a day of the week from an abbreviation. This operator will take an abbreviation of two or more characters for a day of the week and pronounce the full day of the week.

- M is used for pronouncing the month name. It converts a number from 1 to 12 to the appropriate month name. If the number is outside this range it is processed as a number.

- Z is used for skipping leading zeros found in a number string.

Here are some examples of screen position control words:

| | |
|---|---|
| [1,2,5] | row 1, column 2, for 5 characters |
| [#,1,80] | the entire current row |
| [#,✱] | the entire current row |
| [#1,1,80] | the entire current row |
| [#2,✱] | the entire row following the current row |
| [5,✱] | anywhere on row 5 |
| [2,78,2,M] | on row 2, column 78, take two digits and pronounce the month name corresponding to that number |
| [5,1,80,C] | take all of row 5 with case adjust |
| [5,2,2,D] | on row five, column two, get two characters and say the day of the week for which they are an abbreviation |
| [1,2,5,Z] | on row 1, column 2, get the five digit number ignoring any leading zeros. |

Variable Control Words

Variable control words are similar to the emulation control words, but do not represent keys. There are four types of variables that you can access:

- System Variables

- Table Statement Variables

- User-definable Variables

- Character Variables.

SYSTEM VARIABLES: System variable control words are variables that the system updates. There are seven of these and they are:

- [COUNT]

This system variable contains the total count of lines used in the SAY statement of a READITEM or a READNOTE statement. Refer to the READITEM and READNOTE statements in "The Processing Statements" section of this appendix for an example of [COUNT].

- [CURRENT]

This system variable contains the current iteration value of [COUNT]. It is used within the condition section of a READITEM or a READNOTE statement to say the current item or line number. Refer to the READITEM statement in "The Processing Statements" section of this appendix for an example of [CURRENT].

- [INPUT]

This system variable contains the character representation of the telephone buttons ("1" - "0", "*", and "#") the user has pressed between now and the last time [INPUT] was accessed. It can hold up to 16 characters. Refer to the KEY statement in "The Processing Statements" section of this appendix for an example of [INPUT].

- [PF INPUT]

This system variable contains the PF Key corresponding to the current value of [INPUT]. The value of input can be "0" through "24" or "*" or "#". The value "0" is PF10, "*" is PF11, and "#" is PF12.

Examples:

If [INPUT] = "2" then [PF INPUT] is the same as [PF2].
    If [INPUT] = "22" then [PF INPUT] is the same as [PF22].

The other three system variables that you have access to are host status variables. They indicate the status of the host computer system and have a value of either "YES" or "NO", depending on whether the given condition is true or false. They are:

- [AVAILABLE]

This system variable indicates whether the PC is connected to a working host computer. Refer to the IF statement in "The Processing Statements" section of this appendix for an example of [AVAILABLE].

- [INHIBIT]

This variable indicates whether the host system is ready to receive keystrokes. Refer to the WAIT statement in "The Processing Statements" section of this appendix for an example of [INHIBIT].

- [MESSAGE]

This system variable indicates whether a message is waiting on the host computer.

TABLE STATEMENT VARIABLES: TABLE variable control words are used to access the fields in the authorized user list. The variable name begins with an ampersand (&) and are defined in the TABLE statement.

Example:

[&UserID] in the TABLE statement example

In this example, &UserID contains the value of the field called UserID, retrieved by the last LOOKUP statement. Refer to "The Processing Statements" in this appendix for more information on the LOOKUP statement.

USER-DEFINABLE VARIABLES: There are also ten variables that you can assign to any text string. The control words for these variables are [%0] through [%9]. Each of these variables can hold from 0 to 16 characters and are defined by the SET statement. Refer to "The Processing Statements" in this appendix for more information on the SET statement and an example of the user-definable variables.

CHARACTER VARIABLES: There is one last type of the variable control words. These are used in place of specific ASCII characters. Following is a list of the character variable control words and the character they represent:

- [QUOTE]

This character variable can be used in place of a double quote ("). It is included to allow the double quote to be used as a character within a string, even though it delimits a string.

- [CENT]

This character variable can be used in place of the cent character (¢), which has a different translation between the PC and the host computer.

- [VBAR]

This character variable can be used in place of the vertical bar character (|), which has a different translation between the PC and the host computer.

- [SPEECH]

This character variable can be used in place of the character beginning speech control sequences defined in the Specman..

Example: [SPEECH]"[100r"

In this example, the speech rate is changed to 100 words per minute.

THE PROCESSING STATEMENTS

The processing statements are the profile language statements that control most of the system. They consist of commands to speak strings, commands to listen for tones received over the telephone line, and various host session control commands. Following are the processing statements listed in alphabetical order, followed by their descriptions, and an example when needed:

- ANSWER;

This statement causes the telephone to be answered. It contains no parameters.

- DELAY(number);

This statement is a time delay and is used to allow the host computer to finish a task before continuing. The number parameter is a numeric value and represents the number of seconds to wait.

Example: DELAY(2);

In this example, the DELAY statement causes a wait of 2 seconds.

- DIALTONE(repetitions, label);

This statement defines a label to go to when the user hangs up the receiver. The repetitions parameter indicates how many times a MENU or a GET statement is to be repeated before a hang up is assumed. The DIALTONE statement is required in a profile. Refer to the GOTO statement for the description of a label.

Example: DIALTONE(5, 99);

In this example, if there is a dial tone on the telephone line, or a GET or a MENU statement has been repeated five times without any response from the user, this indicates that the user has hung up the receiver, and the statements following 99: are executed.

- GET(type number, time, label);

This statement is used to listen for the tones of the buttons that the user is pressing on the telephone. The buttons pressed can be either interpreted as alphanumeric or numeric. The type parameter is one of the following:

— A for alphanumeric input

— N for numeric input.

Alphanumeric input requires two keystrokes for each character, where as numeric input requires one keystroke.

Note: The technique used for entering numeric and alphanumeric characters over the telephone is explained in Chapter 4. The user's access number is entered as numeric, and the user's logon password is entered as alphanumeric.

The number of characters to be listened for are described by the number parameter. If the # character is used instead of an actual number, characters are received until the # button is pressed on the telephone. The characters received are
available in the [INPUT] system variable. The maximum
length of the [INPUT] string is 16.

The time and label parameters are optional, but if one is
present, both must be present. The time parameter indicates
the number of seconds to wait for user input. The label
parameter indicates where to go if that time is exceeded.
These parameters allow repetitive prompting of the user. The
number of times a GET statement without having any response
from the user is counted. When that number exceeds the
value specified in the DIALTONE statement, control is passed
to the statement following the label specified in the
DIALTONE statement.

Example: GET(A#);

In this example, the GET statement listens for alphabetic
characters until the # button is pressed or until 16
characters are heard.

Example: GET(N6);

In this example, the GET statement listens for six numeric
characters.

Example: GET(N6, 10, 3);

In this example, the GET statement listens for six numeric
characters. If there is no response after ten seconds,
control is passed to the statement labeled 3.

- GOTO(label);

This statement is used to switch control to another
statement. The label is a one to four digit number followed
by a colon. It must begin in column 1, and if used on the
same line as another statement, a blank must separate the
label and the statement.

Example: GOTO(55);

In this example, the GOTO statement causes the statement
labeled 55 and any following statements to be executed.

- HANGUP;

This statement hangs up the telephone. It contains no
parameters.

- IF(condition list);

This statement looks through a set of conditions until it
reaches the first true condition. It then executes any
processing statements associated with that condition. The
format of a condition item is:

String1 comparison String2 {processing statements}

The allowed comparison operators are: =, >=, <=, <>, and
in. There is also an optional null condition which is
defined to always be true when all other conditions fail. []
denotes the null condition. The valid processing statements
are: SAY, REREAD, KEY, DELAY, and GOTO, and are always executed in this order. There are implied condition lists in the MENU, READITEM, READNOTE, and WAIT statements, described later. They follow the same conventions as an IF statement.

Example:

IF([AVAILABLE] = "NO" {GOTO(999)});

In this example, if the PC is not connected to a working host computer, control is passed to the statement labeled 999:.

Example:

IF("MAIN" in [1,*] {KEY("OFF" [ENTER]),
                                      DELAY(1)}
    [] {KEY([PF7]), DELAY(1)});

In this example, the IF statement checks to see if the string "MAIN" is anywhere on line 1, and if it is, OFF is keyed on the host command line, the Enter key is pressed, and the program waits for one second. If not, the PF7 key is pressed, and the program waits for one second.

- KEY(<u>text string</u>);

This statement sends a series of keystrokes to the host session. These keystrokes can consist of standard ASCII characters enclosed in double quotes, any of the control words listed previously, or even characters read from another part of the screen, using the screen position variables.

Example: KEY([INPUT] [ENTER]);

In this example, the KEY statement sends the string of characters represented by the buttons pressed on the telephone followed by the Enter key to the host.

Example: KEY([PF12]);

In this example, the KEY statement presses the PF12 key.

Example: KEY([1,2,5] [ENTER]);

In this example, the KEY statement sends the five characters beginning in row 1, column 2, located on the host screen to the host followed by the Enter key.

- LOOKUP(<u>condition</u>, <u>label</u>);

This statement looks up an entry in the authorized user list defined in the TABLE statement and sets the value of the TABLE variables. If no match is found, the TABLE variables contain the values of the first entry in the authorized user list and control is passed to the first statement following the label. One of the strings in the condition should contain the TABLE variable of a field name found on the TABLE statement. The operators of the condition are identical to the ones defined in the IF statement.

Example:

LOOKUP([INPUT] = [&AccessNo], 99);

In this example, the LOOKUP statement takes the last set of
keystrokes entered over the telephone and compares them with
the given field of each entry in the authorized user list.
If there is a match, the TABLE variables contain the values
of the matching entry. If there are no matches, the TABLE
variables contain the values of the first entry in the
authorized user list, and control is passed to the statement
with a label of 99.

- MENU(<u>time1</u>, <u>time2</u>, <u>time3</u>,
            SAY(<u>text string</u>),
            <u>condition list</u>);

This statement causes a menu in the host system to be read
and waits until a button is pressed on the user's telephone.
The parameters, time1 and time2, are the amount of delay
before the menu is read for uninterrupted and interrupted
(the * button was previously pressed) speech, respectively.
The time3 parameter is the amount of time to wait (in
seconds) before the menu statement is repeated. The SAY
statement is the verbal menu. Once a button is pressed, the
condition list is processed like an IF statement. If there
is no GOTO for the matching condition, the MENU statement
keeps executing.

<u>Example:</u>

```
MENU(0,20,30,
        SAY("Press 1 to re-read the messages
                or 2 to continue."),
        [INPUT] = "1" {REREAD}
        [INPUT] = "2" {KEY([ENTER]),
                            DELAY(1),
                            GOTO(1)}
        [] {SAY("That key is not valid.")});
```

In this example, the MENU statement is being used for a two
item menu. The text string given in the SAY statement is
spoken immediately if the interrupt ( ) button has not been
pressed before this statement. Otherwise, there is a period
of 20 seconds when the user can press a button. The menu
statement is repeated every 30 seconds if no buttons are
pressed. If the 1 button is pressed, the last READITEM or
READNOTE list is read again. If the 2 is pressed, the Enter
key is sent to the host, the program waits for one second,
and the statement labeled 1 gets control. Otherwise, if any
other key was pressed, the user gets a warning.

- READITEM(<u>line1</u>, <u>items</u>, <u>lines</u>,
            IF(<u>condition list</u>),
            UNTIL(<u>condition item</u>),
            <u>condition list</u>);

This statement reads structured data items from the screen.
The line1 parameter gives the starting line of the item to
be read. The parameters, items and lines, give the number
of items and lines per item, respectively. The IF statement
is optional and is executed before the actual items are
read. The system variable, [COUNT], is valid when the IF
statement is executed, so the number of items can be read to
the user. The optional UNTIL clause describes the first
line that is not part of an item. The condition list
parameter is used to control the reading of each item.

Example:

```
READITEM(5,8,2,
                [] {SAY([#,1,80]"."[#2,1,80]".")});
```

In this example, the READITEM statement reads a list of eight items. The first item read is on line 5, and each item is 2 lines long. The SAY statement in the condition list reads both lines of each of the eight items over the telephone.

Example:

```
READITEM(5,8,2,
                IF([COUNT] = "0"
                    {SAY("There are no items on
                                this page.")}
                [] {SAY("There are "[COUNT]
                            " items on this page.")}),
                UNTIL([#,1,80] = " "),
                [] {SAY("Item "[CURRENT]" is: "
                        [#,1,80]"."
                        [#2,1,80]".")});
```

In this example, the READITEM statement reads a list of up to eight items. The reading stops as soon as the condition in the UNTIL statement is true (a blank line in this case). The first item read is on line 5, and each item is 2 lines long. After the count of items is determined, the IF statement is executed and the number of items on this page are told to the user. The SAY statement in the condition list reads the item number and both lines of each item over the telephone.

- READNOTE(line1, line2, line3, line4,
              lines, IF(condition list),
              SKIP(condition item),
              PAGE(KEY(keys),
                        DELAY(time),
                        condition item),
              condition list);

This statement reads a multiple page document over the telephone. The parameters, line1 and line2, describe the starting and ending lines on the first page. The parameters, line3 and line4, describe the starting and ending lines on subsequent pages. The lines parameter describes the maximum number of lines which are to be read. The optional parameter, SKIP, causes all lines down to the line matching the condition to be skipped.

The optional PAGE statement describes how paging is to be performed. It consists of a KEY statement and a condition item with an optional DELAY. The KEY parameter of the PAGE statement contains the key(s) to be pressed when paging forward through the note or document. The DELAY statement, if present, gives the amount of time in seconds to be allowed for each paging, and the condition item is the condition that determines the end of the note or document when the paging is to be stopped.

The last condition list parameter describes what to do with each line of the document. The condition list in this statement does not allow the KEY, GOTO, DELAY, or REREAD statements; however, it does allow the SAY statement and an optional SKIP statement which causes all items to be skipped until the condition is true.

Example:
```
READNOTE(3,19,4,19,100,
                IF([] (SAY("There are"
                                    [COUNT]
                                    " lines in this
                                      document."))),
                PAGE(KEY([ROLL UP]), DELAY(1),
                        [1,41,8] = "page end"),
                [#,*] = " " ()
                [] ( SAY([#,*,c])));
```
In this example, the READNOTE statement causes a multiple page document to be read over the telephone. Line 3 is the first line to be read on the first page; the last line is 19. The first line to be read on the all subsequent pages is 4, and the last is also 19. A maximum of 100 lines will be read. The number of lines in the document is first spoken. The key that pages the document forward is Roll Up, and there will be a one second delay before the new page is read. Paging will continue until the characters page end occur in the first line at column 41. Case translation will take place on all non-blank lines.

- REREAD;

This statement repeats the last list of items or document read in a READITEM or READNOTE statement.

- RING;

This statement waits until the telephone rings before the processing is allowed to continue. While this statement is executing, pressing the Esc key on the PC keyboard will cause the program to exit to DOS.

- SAY(text string);

This statement uses the voice synthesizer to speak a text string over the telephone. It is important to punctuate the end of the string with a period (.), question mark (?), or exclamation point(!).

Example:

SAY("Hello there, how are you doing
        today?");

In this example, the SAY statement reads a fixed string over the telephone to the user.

Example: SAY("The document is from: "
                    [5,2,20]".");

In this example, the string given and the screen characters at row 5, column 2 are spoken over the telephone.

- SET(num, text string);

This statement assigns text strings to the ten user-definable variables, [%0] - [%9].

Example: SET(1,"Hello, ");

In this example, the SET statement sets the value of [%1] to be "Hello, ".

Example: SET(1,[1,2,5]);

In this example, the SET statement will put the five characters currently at row 1, column 2 on the screen into [%1].

- TIMEOUT(time, label);

This statement defines a label to go to when the host computer takes longer than the given time to respond. The TIMEOUT statement is required in a profile.

Example: TIMEOUT(30, 99);

In this example, the host will be considered to have "timed out" if an expected state is not reached within 30 seconds, and processing will continue with the statement following the label, 99:.

- WAIT(condition list1, IF(condition list2));

This statement causes processing to wait until an item in condition list1 is true. The IF statement is optional, and it allows conditions to be checked and operated on while waiting. There may be more than one entry in the first condition list as well as the second. The condition lists are identical to the condition lists of the IF statement.

Example: WAIT([INHIBIT] = "NO" ());

In this example, the WAIT statement waits until keystrokes can be sent to the host computer.

Example:

WAIT("MAIN" in [1,*] (),
    IF([] (KEY([PF7]), DELAY(2))));

In this example, the WAIT statement waits until the characters MAIN occur in the first line on the screen. If MAIN is not present, the PF7 key is pressed, and the program will pause for two seconds.

What is claimed is:

1. A telephone to aplication program interpreter for providing commands to multiple devices in a computer system, the interpreter comprising:
    touch tone interpreter means for converting touch tones received from a telephone to keystroke commands for controlling an application running on the computer system;
    voice synthesizer interpreter means coupled to the application for providing transformation of screens of the application to voice on the telephone as a function of the touch tones; and
    selection means coupled to the touch interpreter means and the voice synthesizer interpreter means for selecting keystrokes corresponding to touch tones such that transformation of screens of various applications to voice on the telephone is independent of the application chosen.

2. The telephone to application program interpreter of claim 1 wherein the touch tone interpreter means interprets a selected touchtone into a user programmed series of keystrokes independently of the application such that the application need not be modified to be compatible with the voice function.

3. The telephone to application program interpreter of claim 1 wherein the voice synthesizer interpreter means interprets a computer system command into further commands for transforming a selected portion of a screen to voice.

4. The telephone to application program interpreter of claim 1 wherein the computer system further comprises:
    a personal computer for controlling the application and interpreter; and
    a voice synthesizer card coupled to said computer for providing the transformation of application display screens into voice.

5. An interpreter for providing commands to multiple devices in a computer system independent of an application running on the computer system, the interpreter comprising:

converting means for converting user input to commands;

function means coupled to the converting means for providing additional functions acting on the application in response to the commands, said additional functions not being provided by the application; and selection means coupled to the converting means for selecting keystrokes corresponding to the user input such that the additional functions acting on the application are independent of the application.

6. The interpreter of claim 5 wherein the application has a plurality of application display screens visible on a display mechanism, and the selection means selects keystrokes as a function of said display screens.

7. The interpreter of claim 6 wherein the display screens have a predetermined format, and wherein the user selects at least one portion of at least one of said screens for operation upon by said additional functions.

8. The interpreter of claim 7 wherein the converting means executes a profile having a WAIT command for specification of at least one portion of at least one of said screens for operation upon by said additional functions.

9. The interpreter of claim 8 wherein the WAIT command comprises a character string corresponding to a known character string on at least one screen for specifying a portion of the at least one screen for operation upon by said additional functions.

10. The interpreter of claim 6 wherein the selection means selects keystrokes as a function of a KEY command in which a user prespecifies a series of desired keystrokes.

11. The interpreter of claim 10 wherein the keystrokes specified in the KEY command comprises user commands for controlling application programs to obtain a desired display screen.

12. The interpreter of claim 5 wherein the converting means executes a profile having a KEY command for specification of keystrokes for selection by the selection means.

13. An interpreter for interpreting a profile to interface additional function to existing applications, comprising:

function interface means for controlling at least one additional function;

application interface means for controlling at least one application;

interpreter means coupled to the function interface means and the application interface means for interpreting the profile to control the application and additional function in accordance with the profile so that the additional function is provided without alteration of the application.

14. The interpreter of claim 13 wherein the profile comprises commands for causing the interpreter means to control the function interface means and the application interface means.

15. The interpreter of claim 14 wherein the additional function operates on data associated with the at least one application, and wherein at least one of the commands identifies the additional function and the data on which the function is to operate.

* * * * *